United States Patent [19]
Fach

[11] Patent Number: 6,028,623
[45] Date of Patent: Feb. 22, 2000

[54] FILM SCANNER WITH DATA INTERFACE

[75] Inventor: Reinhard Fach, Griesheim, Germany

[73] Assignee: U.S. Philips Corporation, New York, N.Y.

[21] Appl. No.: 08/922,695

[22] Filed: Sep. 2, 1997

[30] Foreign Application Priority Data

Sep. 11, 1996 [DE] Germany .......................... 196 36 788

[51] Int. Cl.[7] .................................................. H04N 7/18
[52] U.S. Cl. ............................................................ 348/97
[58] Field of Search ................................ 348/96, 97, 98, 348/99

[56] References Cited

U.S. PATENT DOCUMENTS 5,874,988 2/1999 Gu ............................................. 348/97

FOREIGN PATENT DOCUMENTS 2642599 8/1990 France .............................. H04N 9/11
WO9532582 11/1995 WIPO .............................. H04N 5/253

Primary Examiner—Bryan Tung
Attorney, Agent, or Firm—Edward W. Goodman

[57] ABSTRACT

A device for scanning films (1) includes a converter (6) for forming an image data signal (11), and for improving the data transfer between the film scanner and a computer network coupled thereto. The image data signal (11) is supplied via a first data interface of the converter (6) in a data format for a single-channel transfer. To transfer the information about the contents of a scanned frame from the film scanner to a further processing stage, one transfer channel is sufficient so that further transfer channels, particularly for feedback information to the film scanner, can be dispensed with. This yields particularly a significantly higher transfer rate.

6 Claims, 5 Drawing Sheets

| DPX-SMPTE 268M header information ||||||
|---|---|---|---|---|---|
| Field | Offset | Length | Type | Name | Content |
| 1 | 0 | 4 | U32 | magic number | 0x53445058(ASCII-Code of "SDPX") |
| 2 | 4 | 4 | U32 | offset to image data | 0x00002000 (8k) bytes |
| 3 | 8 | 8 | ASCII | version number of header format | "V1.0" |
| 4 | 16 | 4 | U32 | total image file size in bytes | sizeof(element_1) + sizeof(element_2)+ 0x2000 /*header*/ |
| 17 | 768 | 2 | U16 | image orientation | 0 as default |
| 18 | 770 | 2 | U16 | number of image elements | 2 if key-channel in separate image element (mode 2), otherwise 1 |
| 19 | 772 | 4 | U32 | pixels per line | x-value of reproduction format |
| 20 | 776 | 4 | U32 | lines per image | y-value of reproduction format |
| 21 | 780 | | | | image element 1 |
| 21.1 | 780 | 4 | U32 | data sign | 0 (unsigned) |
| 21.6 | 800 | 1 | U8 | descriptor | 50 = (R,G,B)　　　　mode: 2,3<br>51 = (R,G,B,key)　　mode: 1,4<br>102 = (Cb,Y,Cr)　　　mode: 2,3<br>103 = (Cb,Y,Cr,key)　mode: 1,4<br>151 = (B,G,R)　　　　mode: 2,3<br>52 = (key,B,G,R)　　mode: 1,4<br>6 = (Y-only)　　　　mode: 5,6 |
| 21.7 | 801 | 1 | U8 | transfer characteristic | 3 (logarithmic) or 2 (linear) |
| 21.8 | 802 | 1 | U8 | colorimetric spec. | 2,3,5 |
| 21.9 | 803 | 1 | U8 | bit size | mode 1: 8<br>mode 2,3,4: 10 |
| 21.10 | 804 | 2 | U16 | packing | mode 1,4: 0 (packed into 32-bit words)<br>mode 2,3: 1 (filled into 32-bit words) |
| 21.11 | 806 | 2 | U16 | encoding | 0 |
| 21.12 | 808 | 4 | U32 | offset to data | 0x00002000 |
| 21.15 | 820 | 32 | ASCII | description | mode 2,3: "R,G,B"<br>mode 1,4: "R,G,B,key"　etc. |

FIG. 2A

| DPX-SMPTE 268M header information ||||||
|---|---|---|---|---|---|
| Field | Offset | Length | Type | Name | Content |
| 22 | 852 | image element 2 (only in mode 2 with keychannel as separate set) ||||
| 22.1 | 852 | 4 | U32 | data sign | 0 (unsigned) |
| 22.6 | 856 | 1 | U8 | descriptor | 4 |
| 22.7 | 857 | 1 | U8 | transfer characteristic | 3 (logarithmic) |
| 22.8 | 858 | 1 | U8 | colorimetric spec. | 3 |
| 22.9 | 859 | 1 | U8 | bit size | 10 |
| 22.10 | 860 | 2 | U16 | packing | 1 (filled into 32-bit words) |
| 22.11 | 862 | 2 | U16 | encoding | 0 |
| 22.12 | 864 | 4 | U32 | offset to data | 0x00002000 + sizeof(element_1)+ (0x00002000-sizeof(element_1)) %0x00002000) |
| 22.15 | 868 | 32 | ASCII | description | "key" |
| gap ||||||
| 58 | 1920 | 4 | U32 | SMPTE timecode | actual filmtimer value |
| 59 | 1924 | 4 | U32 | SMPTE user bits | film keycode in case |
| 61 | 1929 | 1 | U8 | field number | |
| gap ||||||

FIG. 2B

| DPX-User defined data ||||||
|---|---|---|---|---|---|
| Field | Offset | Length | Type | Name | Content |
| 75 | 2048 | 32 | ASCII | user identification | "BTS HiRes Scanner" |
| 76 | 2080 | 1 | U8 | transfer mode | 1/2/3/4 |

FIG. 2C

| Byte | 0 | | | | | 1 | | | | 2 | | | | | 3 | | | |
|---|---|---|---|---|---|---|---|---|---|---|---|---|---|---|---|---|---|---|
| Bit | 31 | · | · | · | 24 | 23 | 22 | · | · | · | 16 | 15 | · | · | · | 11 | 10 | · | · | 8 | 7 | · | · | · | 3 | 2 | · | · | 0 |
| Header_Area | ULP-ID | | | | | P | B | Reserved | | | | | | | | D1_Area_Size | | | | | | | | | | D2_Offset | | | |
| | D2_Size | | | | | | | | | | | | | | | | | | | | | | | | | | | | |
| D2_Area | D2_Data_Set | | | | | | | | | | | | | | | | | | | | | | | | | | | | |

FIG. 4

FILM SCANNER WITH DATA INTERFACE

BACKGROUND OF THE INVENTION

1. Field of the Invention

The invention relates to a device for scanning films by means of a converter for forming an image data signal.

2. Description of the Related Art

Conventional film scanners scan the consecutive frames of cinematographic films by means of an opto-electronic transducer and generate a video signal modulated in accordance with the image information of the frames, this video signal complying with a given television transmission standard (for example, NTSC, PAL, SECAM). Such standard video signals cannot be received and directly processed by computers. For this reason, video converters convert the analog or digital standard video signals into formatted data which can be processed by coupled computers. However, the resolution of these digital video signals does not comply with professional applications. Moreover, the data transfer rate of such digital video signals is unsuitable for, for example high-resolution frames.

SUMMARY OF THE INVENTION

It is therefore an object of the invention to provide a film scanning device improving the data transfer between the film scanner and a computer network coupled thereto.

According to the invention, this object is solved in that the image data signal is supplied via a first data interface of the converter in a data format for a single-channel transfer. Film scanners are often provided with several connections to a coupled device (for example, a digital recorder for recording image data signals). In addition to the image data signal with the information about the contents of the scanned film image, control and drive data, such as, for example, information about the state of the coupled apparatuses (for example, whether the recorder is ready for use or whether the corresponding storage medium has been inserted), are exchanged bidirectionally. The converter of the film scanner according to the invention generates an image data signal with a data format requiring only one connection. To transfer the image data signals of a scanned image from the film scanner to a further processing stage, one transfer channel is sufficient so that further transfer channels, particularly for feedback to the film scanner, can be dispensed with. This leads to a significantly higher transfer rate.

In a preferred embodiment of the invention, the first data interface corresponds to a HIPPI-PH standard, and the data format corresponds to a HIPPI-FP standard modified by omitting information about a second area (D1__Area) in a first area (Header__Area). The HIPPI-PH standard (high-performance parallel interface, mechanical, electrical and signaling protocol specification) in accordance with ANSI X3. 183-1991 lays down a 32-bit wide, physical interface. The associated HIPPI-FP standard for the data transfer format via this interface is specified in the data transfer protocol (high-performance parallel interface, framing protocol). A data packet in accordance with the HIPPI-FP standard consists of the three areas Header__Area, D1__Area and D2__Area. The second area (D1__Area) laid down in the HIPPI standard is not used in the data format used in accordance with the invention. Consequently, the information about the value of the second area (D1__Area) can also be dispensed with in the first area (Header__Area). In the D1__Area, control information (for example, status information) in accordance with the HIPPI-FP standard are exchanged via the HIPPI channel. In the transfer modified in accordance with the invention, only the image data are transferred so that both the D1__Area itself and the information about its value are not transferred. Consequently, the HIPPI-FP standard is maintained as a framework for a transferred data packet, but the data format within this framework is modified. High-resolution image information data are made available at the output of the film scanner with a first data interface in accordance with the invention on the basis of the HIPPI-PH standard for transferring an image data signal in a modified data format within the data transfer protocol of the HIPPI-FP standard. The image information data in such a format can be received and processed by coupled computers (for example, of Silicon Graphics or Sun). The transfer rate is not determined by a synchronous video transfer but by the bandwidth of the input channel of the computer. Such computers are preferably used in the field of TV commercials, post-production or digital mastering for TV distribution.

A further embodiment of the invention is characterized in that the converter is provided with a second, bidirectional data interface for transferring control data between the converter and a device coupled thereto. In contrast to the image information data, the control data are transferred bidirectionally on a data channel having a narrower band. In this case, a bidirectional connection is useful, for which a narrower transfer channel is sufficient for the overall quantity of control data. This provides the possibility of a reduction to a single-channel transfer of the image data signals without loss of information, hence a considerable reduction of the number of transfer components.

In a further embodiment of the film scanner according to the invention, the second data interface of the converter is an Ethernet standard interface with a data transfer protocol ESlan-1. The Ethernet standard interface with the data transfer protocol ESlan-1 is known, and so the transfer of control data can be realized without any problem and the transfer of image information data is alleviated. In contrast to the first data interface, the transfer of the control data should be effected bidirectionally, because information from an apparatus connected thereto, such as, for example, a recording apparatus (digital recorder) or a control screen, about disturbances or general circumstances should be transferred as feedback information. To this end, the transfer in accordance with the Ethernet standard is used because it can easily be realized and handled. Any other transfer channel suitable for a bidirectional transfer may also be used, advantageously with a possibly narrow-band layout.

In a further advantageous embodiment of the invention, the image data signal is supplied in at least a data format for consumer applications. The data format of the image data signal of a scanned film frame within the prescribed area in a data packet in accordance with the HIPPI standard is selectable. The invention thus provides the advantage that also data formats for consumer applications (for example, the Tag Image File Format, TIFF) can be produced, which formats are characterized by setting given parameters in the HIPPI protocol. With this characteristic feature, the film scanner according to the invention can also provide image data for wider uses in the multimedia field.

A further preferred embodiment of the film scanner, according to the invention, is that the film scanner is provided with at least a transport device for longitudinally moving the film, at least an opto-electronic transducer for converting film frames into an electric image signal, at least an image signal processing device, and at least a control device for the transport device, the opto-electronic transducer and the image signal processing device.

The invention also relates to a method of forming an image data signal in a converter in a film scanner, which solves the envisaged object in that the image data signal is supplied via a first data interface of the converter in a data format for a single-channel transfer. In contrast to known methods of transferring image data signals, control data are transferred on a separate transfer channel in accordance with the invention. Consequently, the format for the data to be transferred is modified in such a way that the converter generates image data signals and supplies them via the first data interface, comprising only the image information of the scanned film frame and thus rendering a single-channel transfer possible. For example, the HIPPI standard may be used for the transfer, and the data within the HIPPI-FP standard data format are modified for a single-channel transfer.

The invention also relates to an image data signal in a converter in a film scanner with which the envisaged object is solved in that the image data signal is present in a data format for a single-channel transfer. Since only the image information of the scanned film frame is present in the image data signal, a data packet, for example, in accordance with the HIPPI standard, only uses the area intended for transfer. In this area, which is provided for transferring the image information, for example, within the HIPPI data packet, the image information may also be inserted particularly in a selectable format so that, for example, data formats are transferred which are suitable for consumer applications.

These and other aspects of the invention are apparent from and will be elucidated with reference to the embodiments described hereinafter.

BRIEF DESCRIPTION OF THE DRAWINGS

In the drawings:

FIG. 2A shows a table with a first part of the structure of a data packet in accordance with the standardized DPX format;

FIG. 2B shows a table with a second part of the structure of a data packet in accordance with the standardized DPX format;

FIG. 2C shows a table with a specific part of the structure of a data packet in accordance with the standardized DPX format;

FIG. 4 shows the format of a data packet in accordance with the data transfer protocol based on a modified HIPPI-FP standard.

DESCRIPTION OF THE PREFERRED EMBODIMENTS

Figure 1:
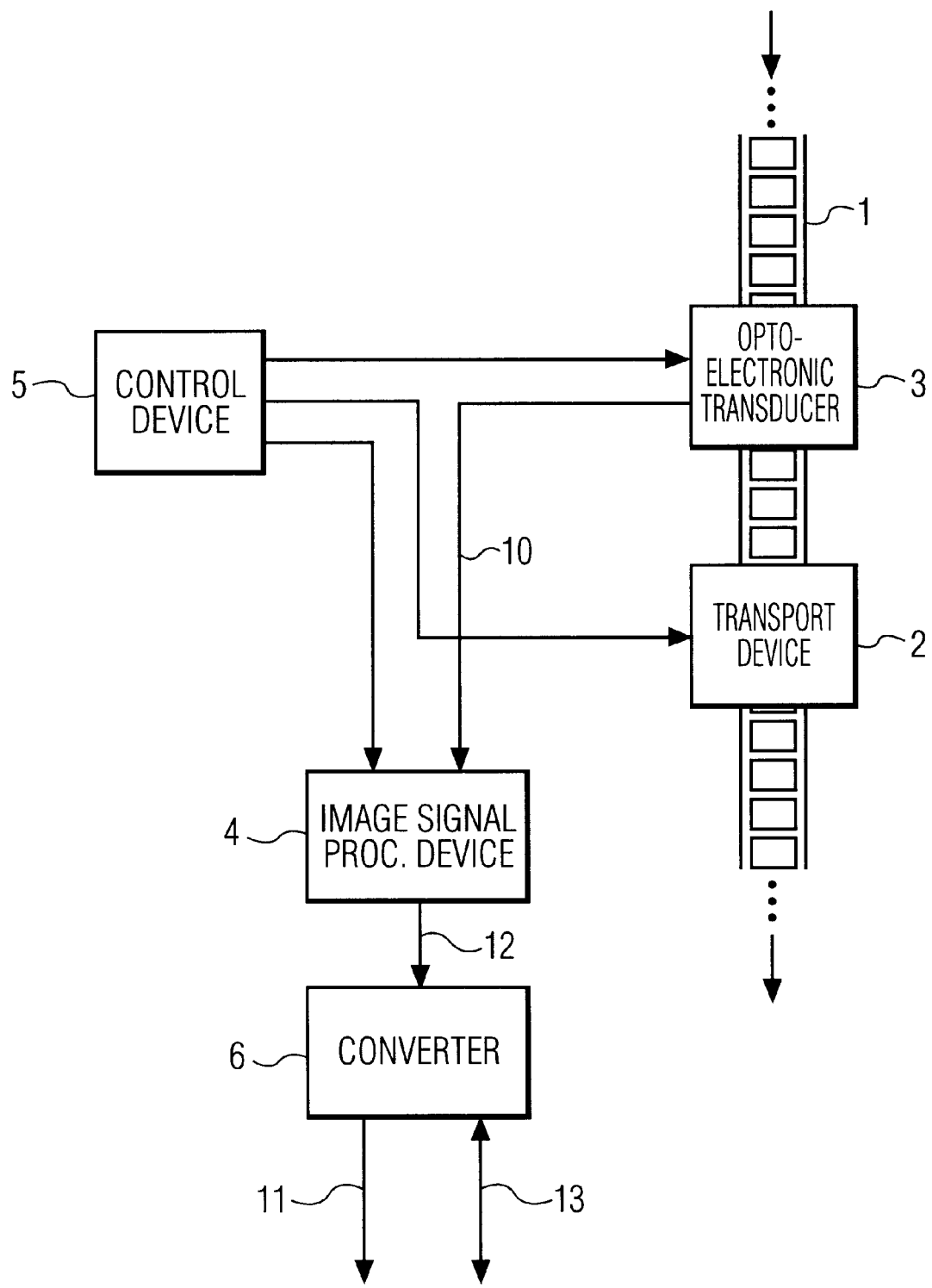
FIG. 1 shows diagrammatically, a film scanner according to the invention, with a functional description of the devices concerned.

FIG. 1 shows diagrammatically, the film scanner according to the invention, in which a film 1 to be scanned is moved by means of a transport device 2 through an opto-electronic transducer 3. The opto-electronic transducer 3 successively scans the consecutive frames of the film 1 and forms an electric image signal 10 in accordance with the image information of the film frames. This electric image signal 10 is applied to a coupled image signal processing device 4. The transport device 2, the opto-electronic transducer 3 and the image signal processing device 4 are monitored and controlled by a control device 5. The control device 5 controls the transport of the film 1 and activates the opto-electronic transducer 3 as soon as a film frame is to be scanned. Moreover, the control device 5 controls the transfer of the electric image signal 10 from the opto-electronic transducer 3 to the image signal processing device 4 and responds, by means of a control function, to error detections of the assemblies coupled thereto. A converter 6, for forming an image data signal 11 from the electric image signal 10, is coupled to the image signal processing device 4. The converter 6 generates digital video signals 11 from the analog standard video signals 12 of the image signal processing device 4. High-resolution image information data are available within these digital video signals 11, this data being transferred via a modified standard-HIPPI-interface to a subsequent processing stage. Moreover, the converter 6 supplies control and status data 13 via a second data interface for which an available, or easily installable, Ethernet interface is used. The control and status data 13 are bidirectionally exchanged in accordance with the data transfer protocol ESlan-1. In this way, a connected digital recorder, which records the digital video signals 11 of the film scanner, can communicate with the converter 6. The converter 6 supplies control information 13 for the recorder which supplies a corresponding feedback or status information 13.

The image information data can be transferred in accordance with the HIPPI-FP standard in different formats. The film scanner provides the data, for example, in the known DPX format, (Digital Picture Exchange Format), which is shown in FIGS. 2A, 2B and 2C. The tables show the columns and contents of a header of a data packet with the image information data of a scanned film frame when using the DPX-SMPTE-format (Society of Motion Pictures Transfer Engineers). This is a standardized data format for the exchange of digital image data which may comprise image information data such as, for example, the number of lines per frame or the number of pixels, but also additional information such as the scanned film type (positive or negative) or the camera angle for the scanned frame. FIGS. 2A and 2B show the structure contents of the general part of the header laid down in the standard. In addition, information relating to the film scanner, according to the invention, is supplied in a second, specific part. FIG. 2C shows this part in which a "user identification" for the relevant apparatus with the HIPPI interface and an identification for the transfer mode used, i.e., the method for converting digital data in the 32-bit wide HIPPI channel. The total size of a complete data packet for a film frame may amount to several Gbytes.

Figure 3:
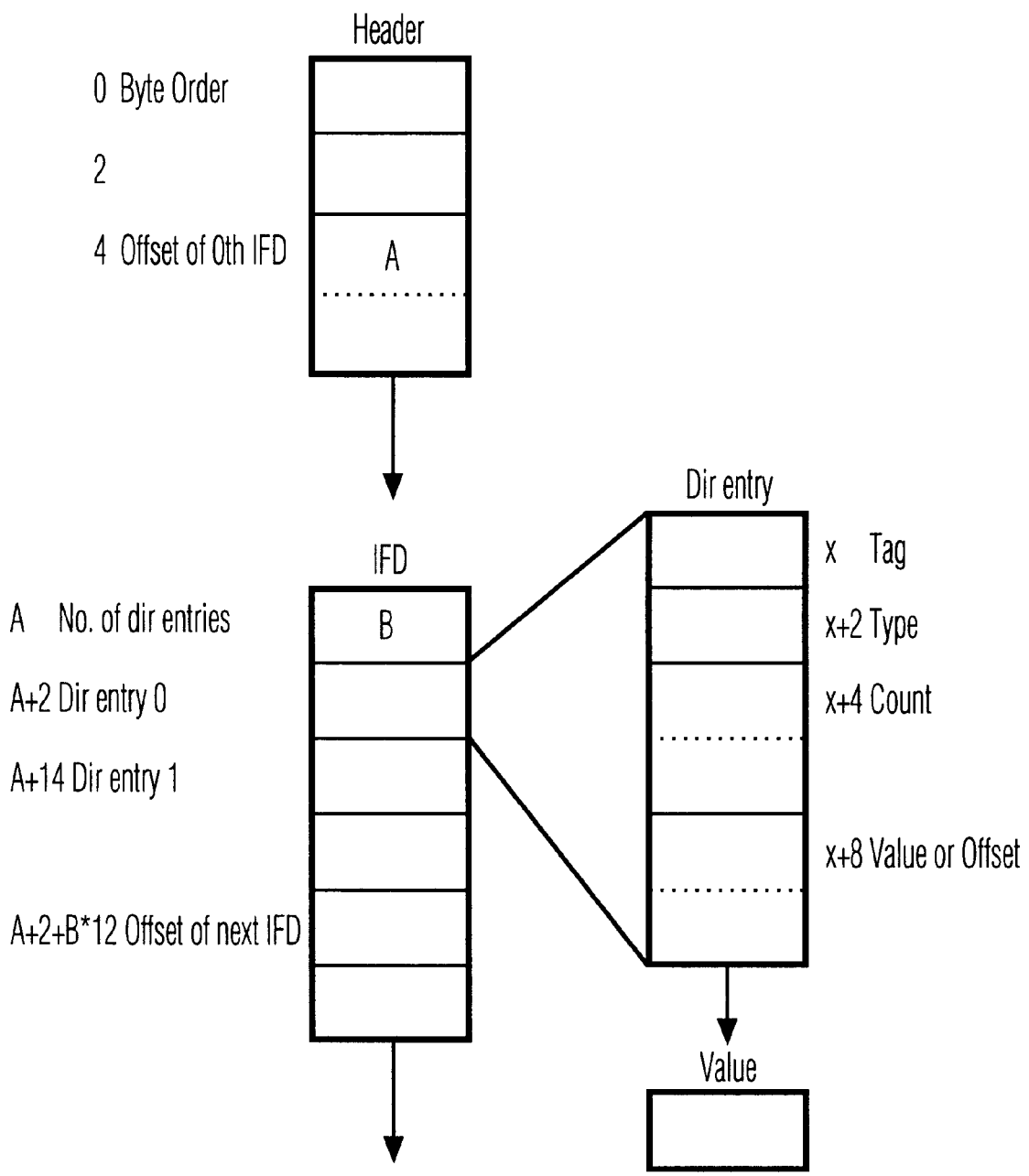
FIG. 3 shows diagrammatically, the standardized image data format Tag Image File Format (TIFF)

FIG. 3 shows diagrammatically the standardized TIFF format (Tag Image File Format) in which the image information data of the scanned film frame can also be transferred. This data format, which is also standardized, is particularly used as a format for consumer applications. A TIFF data file starts with an 8-byte data file header having a pointer to an Image File Directory (IFD). In this IFD, information about the frame itself and pointers to the image data are stored. The maximum length of such an image data file is up to 4 Gbytes.

A table in FIG. 4 shows the structure of a 32-bit modified HIPPI-FP packet. A data packet, in the standardized HIPPI-FP format comprises the three areas referred to as Header__Area, D1__Area and D2__Area. The HIPPI-FP format data packet according to the invention, does not comprise a D1__Area so that this capacity can be economized. In the HIPPI-FP packet, the byte sequence is opposed to the bit sequence so that the LSB (Least Significant Bit) is in byte 3 and the MSB (Most Significant Bit) is in byte 0. Next is a 32-bit word of the Header_Area. The Upper-Layer-Protocol-Identification is denoted by ULP-ID. This information is fixed in byte 0, i.e., in the bits 31 . . . 24 and can be configured by a control device, in which the presetting is 10000000 (1xxxxxxx=locally assigned). The ULP-ID generally gives an identification for a software process which is to be used or operated by the transferred data packet. When a data packet is received from a work station comprising a plurality of processors, a processor can also be selected which takes over the processing of the transferred data in a given process mode. In the film scanner, according to the invention, the ULP-ID can be freely chosen and set in a supplied image data signal 11 in the modified HIPPI format, so that an adaptation to arbitrary coupled apparatuses will be possible, while avoiding collisions due to access of further apparatuses to the same process or processor.

In the bit 23, the reference P denotes a D1_Data_Set_Present which is set at "0". This characterizes whether data are present in the D1_Area. In the embodiment of the standard modified in accordance with the invention, no data are transferred in the D1_Area so that P is set at 0. In the bit 22, a Start_D2_on_Burst_Boundary is fixed, which is abbreviated to B and is also set at "0". Information about the starting point of the D2_Area is supplied thereby. The D2_Area may start, for example, directly at or before the start of a second burst of a data packet, a burst comprising 256 data words, which corresponds to 1 kbyte. The information of the D1_Area_Size is in the bits 10 . . . 3 and indicates the size of the D1_Area. When there is no D1_Area in the data packet, as in the case of the HIPPI-FP format used for the film scanner according to the invention, this bit sequence, like P, is also set at "0". In the D1_Area, control or additional data are bidirectionally transferred in accordance with the standard, which data generally have a size of 1 kbyte. In the bits 2 to 0, information D2_Offset about the start of the data of the D2_Area is made available. The value is then set at "0" when there is no delay (offset) and when the data start directly at the start of the D2_Area. In the Header_Area, information D2_Size indicating the length of the dates in bytes in the D2_area is supplied in the form of a further 32-bit word, with only the net quantity of data without filler bits at the end being taken into account. The size of D2_Size is then between 0 and 4 GByte−2.

Two different modes are used for the connection via the HIPPI interface. The "datagram" and "stream" modes can be selected by transferring corresponding control data via the control channel. In the stream mode, the film scanner establishes a single-channel connection on request and sends several data packets through this connection. However, in the datagram mode, only a single data packet is sent through a single channel connection which is also built up on request. Subsequent to the transfer of the single data packet, the connection is automatically eliminated in this mode. In any case, each data packet comprises the image information data of a frame of the scanned film.

What is claimed is:

1. A device for scanning films having a converter for forming an image data signal, characterized in that said converter comprises means for supplying the image data signal via a first data interface of the converter in a data format for a single-channel transfer, wherein the first data interface corresponds to a HIPPI-PH standard, and the data format corresponds to a HIPPI-FP standard modified by omitting information about a second area (D1 Area) in a first area (Header Area).

2. The device for scanning films as claimed in claim 1, characterized in that the converter further comprises a second, bi-directional interface for transferring control data between the converter and a device coupled to the converter.

3. The device for scanning films as claimed in claim 2, characterized in that the second, bi-directional interface of the converter is an Ethernet standard interface with a data transfer protocol ESlan-1.

4. The device for scanning films as claimed in claim 1, characterized in that the image data signal is supplied in at least a data format for consumer applications.

5. The device for scanning films as claimed in claim 1, characterized in that the device further comprises:

a transport device for longitudinally moving the film;

an opto-electronic transducer for converting film frames into an electric image signal;

an image signal processing device; and a control device for the transport device, the opto-electronic transducer and the image signal processing device.

6. A method of forming an image data signal in a converter in a film scanner, characterized in that the method comprises the steps:

opto-electronically scanning the film to form an electric image signal;

converting the electric image signal into an image data signal in said converter; and supplying the image data signal via a first data interface of the converter in a data format for a single-channel transfer, wherein the first data interface corresponds to a HIPPI-PH standard, and the data format corresponds to a HIPPI-FP standard modified by omitting information about a second area (D1 Area) in a first area (Header Area).

* * * * *